United States Patent [19]
Amirouche

[11] Patent Number: 5,536,059
[45] Date of Patent: Jul. 16, 1996

[54] SEAT SUSPENSION SYSTEM USING HUMAN BODY RESPONSES

[75] Inventor: Farid M. L. Amirouche, Highland Park, Ill.

[73] Assignee: University of Illinois, Chicago, Ill.

[21] Appl. No.: 334,153

[22] Filed: Nov. 4, 1994

[51] Int. Cl.$^6$ ........................................... B60N 2/52
[52] U.S. Cl. ..................... 296/65.1; 188/299; 248/550; 248/566; 267/131; 280/707
[58] Field of Search ........................... 296/65.1; 180/282; 280/707, 714; 188/299; 267/131; 248/550, 559, 566; 364/424.05

[56] References Cited

U.S. PATENT DOCUMENTS 5,358,305  10/1994  Kaneko et al. ..................... 296/65.1

Primary Examiner—Andrew C. Pike
Attorney, Agent, or Firm—Banner & Allegretti, Ltd.

[57] ABSTRACT

An active seat suspension system for equipment that transfers vibration to a human operator provides human body vibration control and, thus, a more comfortable environment for the operator. The system utilizes a "man in a loop" control strategy, where both the equipment and human operator model are analyzed as a dynamic system. The seat suspension parameters are evaluated through optimization, which assumes, under normal stochastic conditions, that the vibratory inputs to the system are unknown. A controller estimates their values in real time, and a preferred characteristic force between the seat and machinery is determined. The characteristic force determined minimizes a cost function. Using an output from the controller, an actuator (which may be either active or semi-active) substantially applies the characteristic force between the seat and machinery, resulting in reduced vibration being transmitted to the human operator.

8 Claims, 6 Drawing Sheets

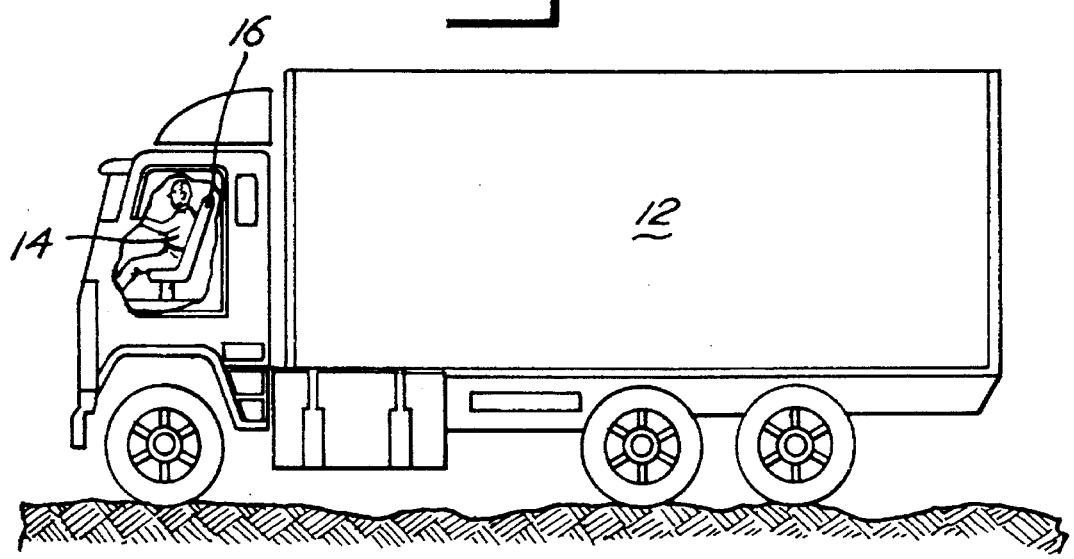
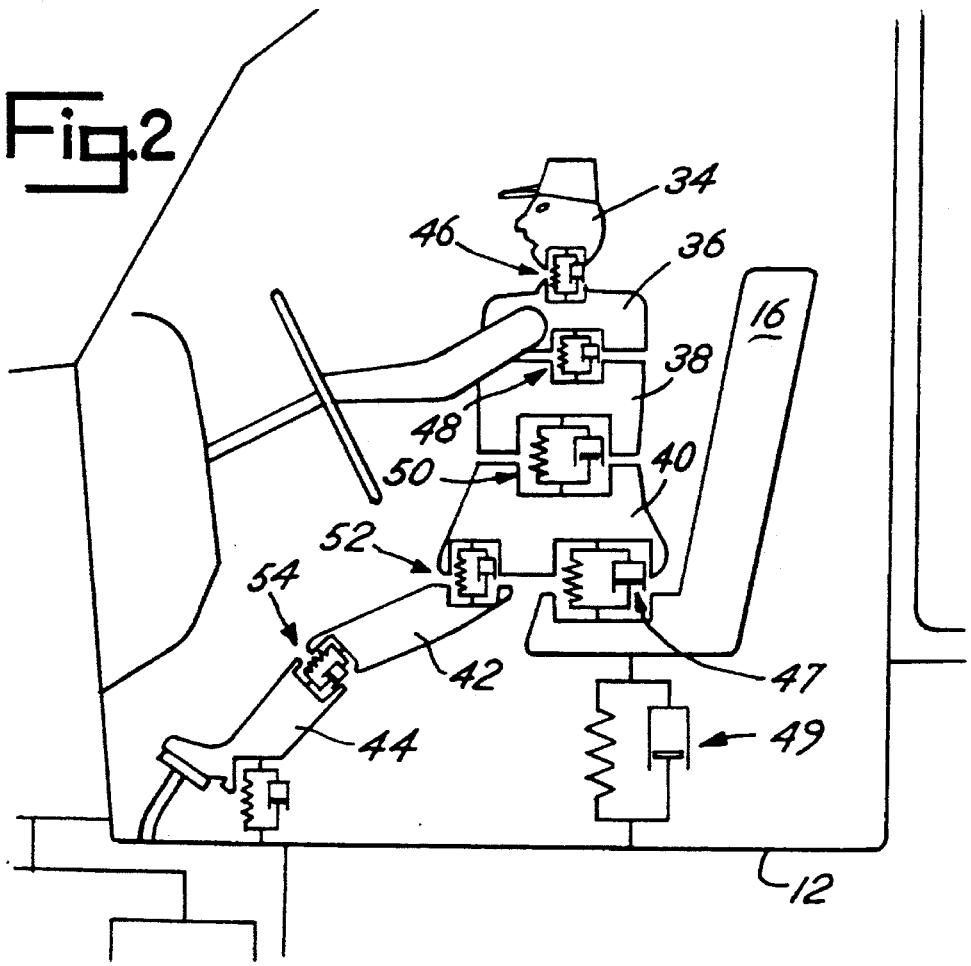

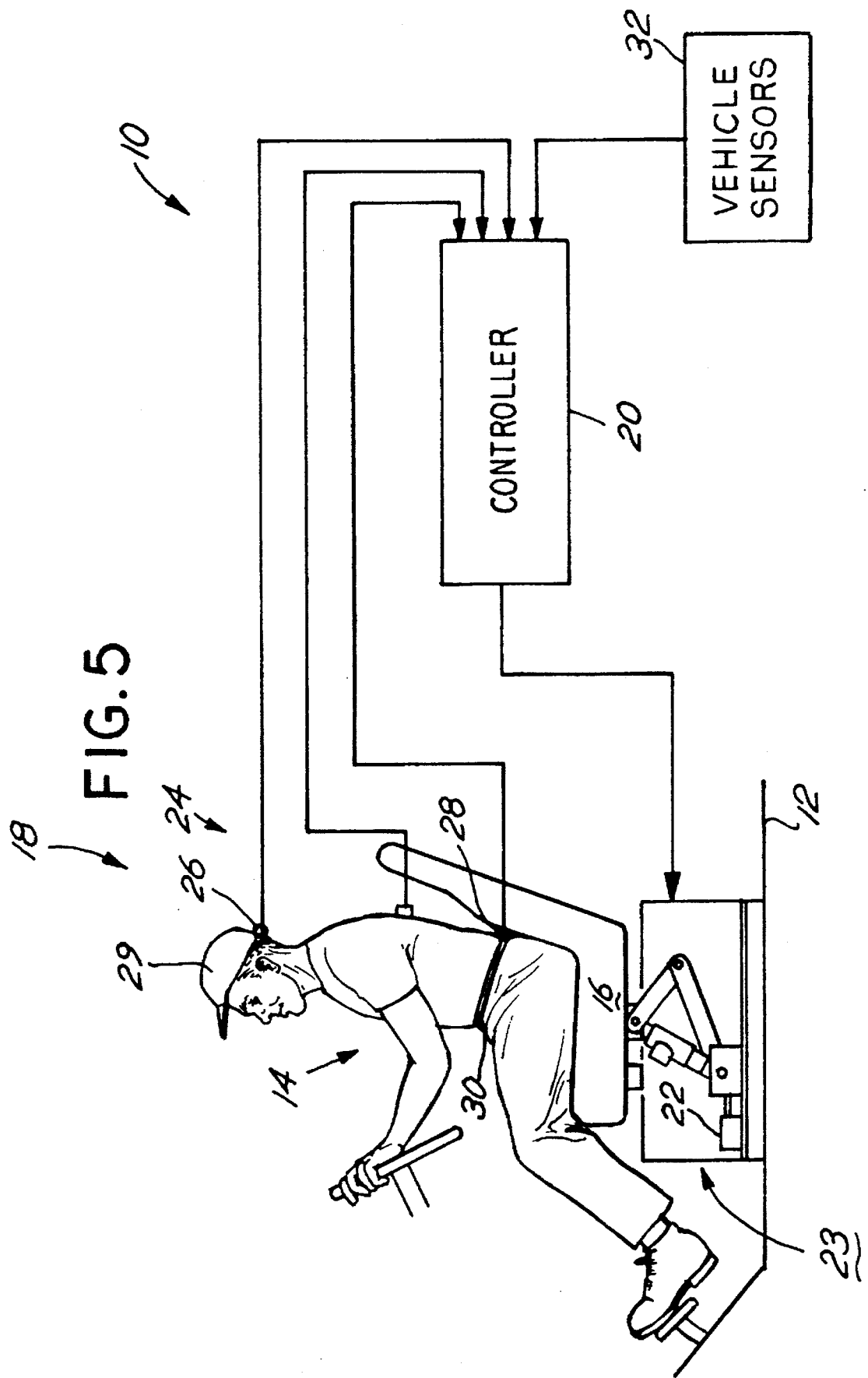

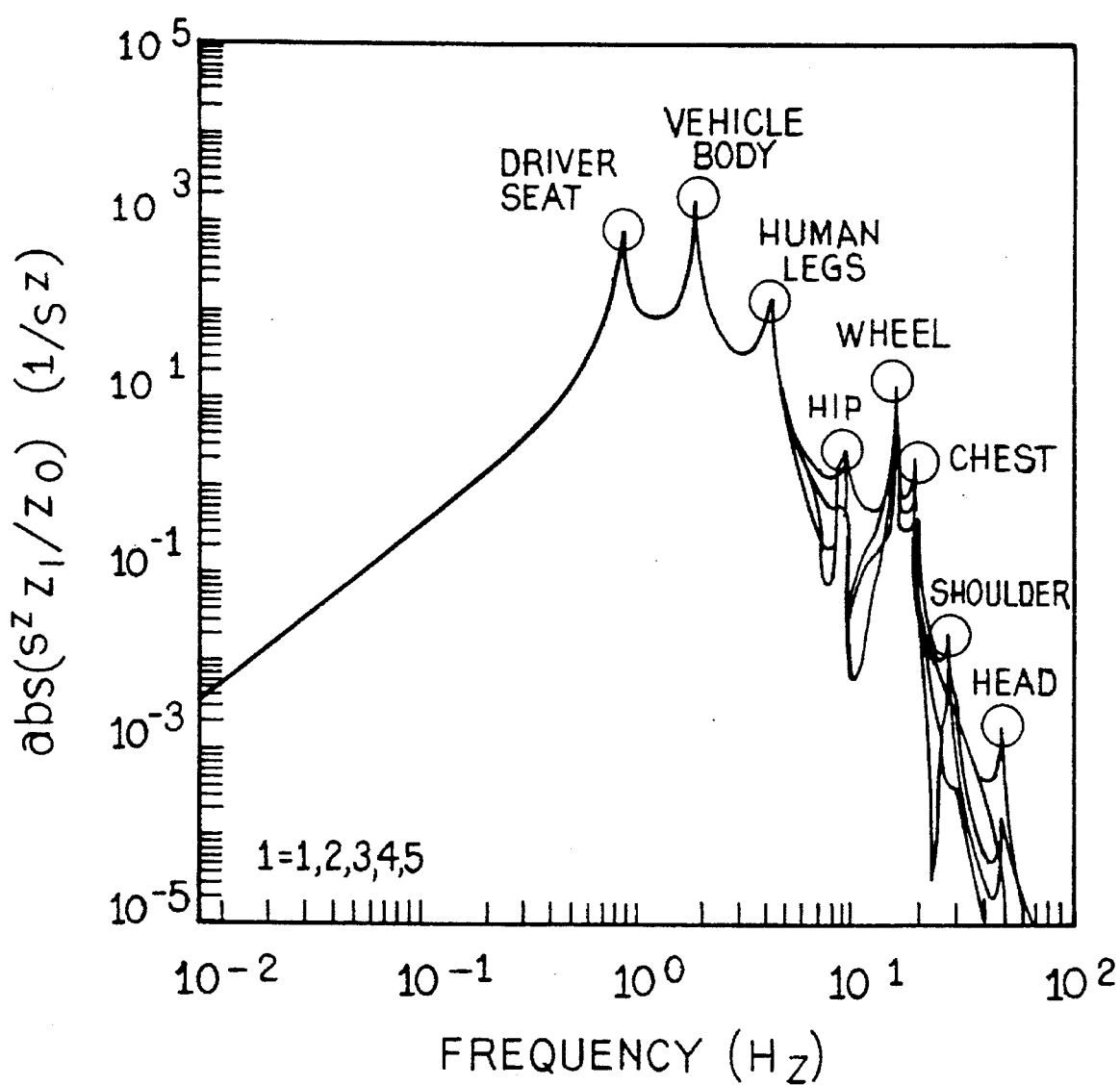

5,536,059

SEAT SUSPENSION SYSTEM USING HUMAN BODY RESPONSES

BACKGROUND OF THE INVENTION

The present invention relates generally to suspension systems and, more particularly, to seat suspension systems for human operators positioned in or on moving machines. Such machines may include, for example, trucks, aircraft, earth-moving or mine exploration machinery, boats, off-road vehicles, or automobiles, where such machines subject the human operator to vibration.

The exposure of seated workers to long-term vibration may be detrimental to a worker's health, performance, and safety. In many cases, low frequency vibrations, which are prevalent in heavy vehicles, are a major contributing factor to low back pain, fatigue, and stress for the worker.

Thus, for example, the risk factor associated with back illness, such as low back pain and spinal disorders, is substantial for many heavy equipment operators, such as some truck drivers. Such risk for truck drivers is due, in large measure, to the long-term exposure of the trucks and drivers to irregular road excitations.

Many vehicles include a suspension system. Such a system may include spring and shock absorber assemblies between the vehicle's axles and the frame of the vehicle, as well as springs and a cushion built into the driver's seat. Many of such currently available suspension systems have been designed and tested with the objective of attempting to reduce the vibration transmitted to the operator's seat or to the floor beneath the operator's seat. Many seat suspension designs are based on pressure distribution of the body on the seat and movement of the seat itself, rather than the driver's physical response to road vibrations.

Unfortunately, many of the presently available suspension systems still transfer substantial vibration to the operator, aggravating the health risk to the operator. In addition to providing a health risk, poor suspension systems provide an uncomfortable environment for the operator. Consequently, the operator may become unnecessarily tired and his/her performance in operating the equipment may suffer as a result.

SUMMARY OF THE INVENTION

In a principal aspect, the present invention relates to a control that monitors vibration and controls the transmission of vibration to the body of a machinery operator. The system utilizes a "man in a loop" control strategy, where both the machinery and the human operator are coupled and analyzed as a dynamic system.

In one embodiment, sensors on both the operator's body and the machinery transmit signals to a controller. The controller determines what force should be applied between the seat and the rest of the vehicle to reduce the force that would otherwise be applied by the machinery to the human operator. The controller then transmits a control signal to an actuator positioned between the seat and vehicle. The actuator responsively controls the spring and/or damping force between the seat and machinery. In another embodiment, a model of the human body, and the effects that vibration have upon it, are used in lieu of actual sensors on the body of the machinery operator.

In another embodiment, the actuator is an active device that may use energy to apply a suitable force between the seat and machinery. In an alternative embodiment, the actuator is only semi-active and, in accordance with the control signal, controls the damping characteristics of a suspension assembly between the seat and machinery.

Thus, an object of the present invention is an improved suspension system between a seat and machinery. A further object is a seat suspension system for a vehicle that provides better ride quality and comfort.

Another object is a seat suspension system that further reduces the vibration transmitted to the body of an operator of machinery. Yet still another object is a seat suspension system that reduces the acceleration of and the work performed by the upper body muscles of the machinery operator. These and other objects, features, and advantages of the present invention are discussed or apparent in the following detailed description.

BRIEF DESCRIPTION OF THE DRAWINGS

A preferred embodiment of the present invention is described herein with reference to the drawings wherein:

FIG. 1 is a side view of a truck utilizing the present invention, with a partial cutaway showing a driver;

FIG. 2 is diagram of a mechanical model of the body segments of the driver shown in FIG. 1;

FIG. 5 is a diagram of the controller and actuator that may be used with the invention shown in FIG. 4;

FIG. 6 is a Bode graph showing an example of acceleration experienced by different parts of a human operator of machinery, such as the driver shown in FIG. 1, as a function of vibration frequency;

FIG. 7 are graphs showing examples of damping coefficients for a semi-active actuator which may be used with the invention shown in FIG. 4 and;

DETAILED DESCRIPTION OF THE PREFERRED EMBODIMENTS

Referring to FIGS. 1–7, the present invention is an improved seat suspension system 10. The system 10 controls the forces applied by a machine, such as a truck 12, to a human operator or driver 14. The driver 14 is positioned in a truck seat 16.

For ease of illustration, the seat 16 is shown as a conventional platform for supporting the driver. Also, as used herein, the term "seat" is defined as a component that is distinct from the truck 12 itself.

It must be understood that the present system 10 may be used in a wide range of applications, including aircraft, earth-moving equipment, boats, off-road vehicles, or automobiles, where such machines subject the human operator to vibration. The example of a truck 12 and truck seat 16 is shown only in order to illustrate the system 10. The system 10 may be used to control vibration transmitted by a wide range of equipment to operators, who may be in a variety of different positions.

Figure 3:
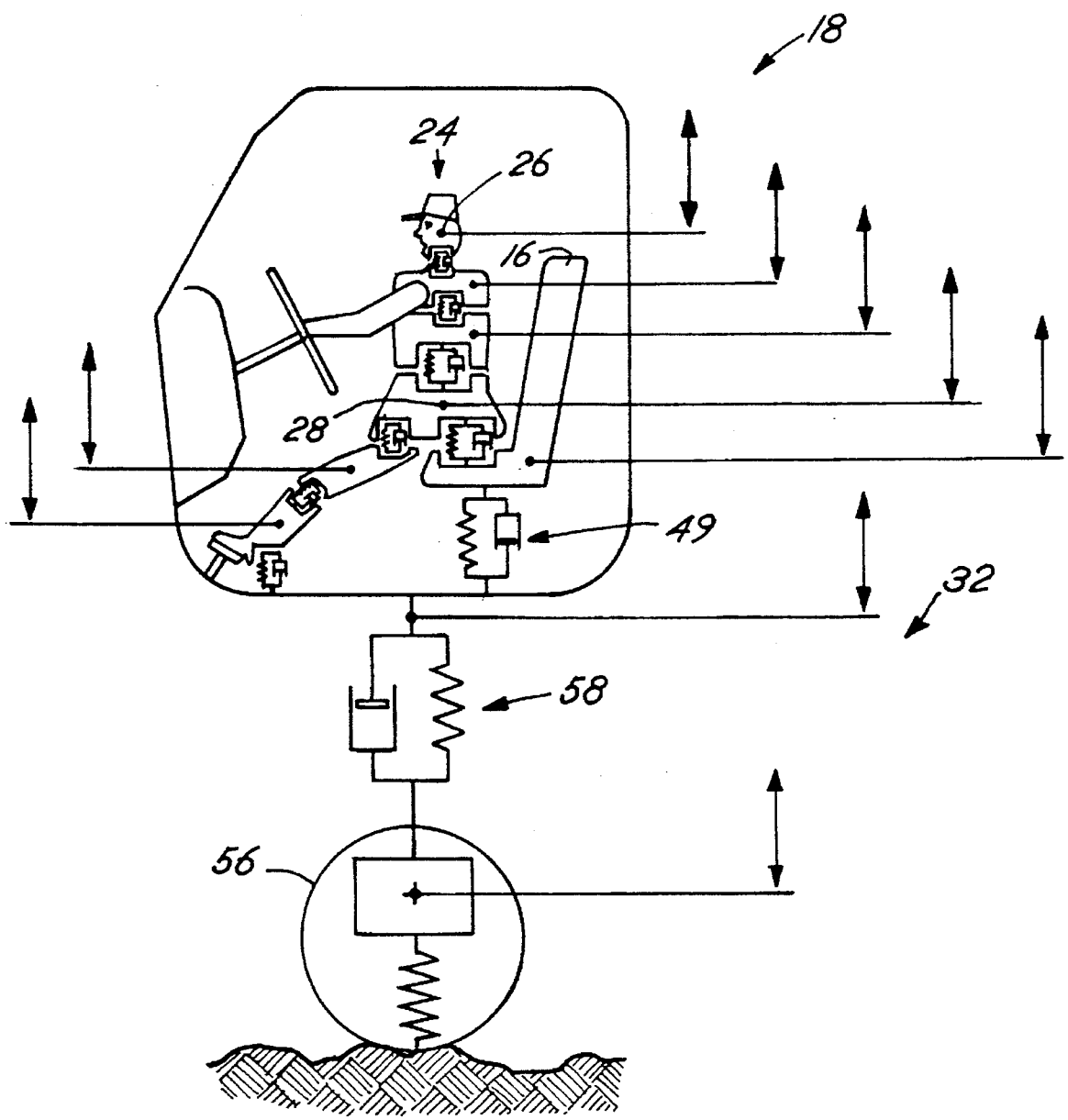
FIG. 3 is diagram of a model of the truck and driver shown in FIG. 1.

As shown in FIGS. 3 and 5, the system 10 may include a plurality of sensors 18, a controller 20, and an actuator 22. The sensors 18 may be piezoelectric accelerometers, such as, for example, accelerometer types 4321, 4374, or 8200 manufactured by Bruel & Kjaer of Naerum, Denmark. Such sensors may be less than 30 millimeters across is size and provide a sufficiently accurate movement signal reflecting acceleration to which they are subjected. Other sensors which measure, for example, velocity rather than acceleration, might also be utilized.

In one embodiment, a plurality of body sensors 24 are interconnected to the driver 14. A head sensor 26 may be interconnect to, for example, a hat or helmet 29 (to measure head vibration), and a hip sensor 28 may be interconnected to a belt 30 (to measure hip vibration). As illustrated in FIG. 3, other sensors may be connected to other segments of the driver's body. Also, vehicle sensors 32 are connected to the truck 12. Such vehicle sensors may be connected the frame or axle of the truck 12. As illustrated by the arrows of FIG. 3, the sensors 18 are configured to measure vertical (up-and-down) acceleration.

The body and vehicle sensors 24, 32 provide electrical movement signals to the controller 20. The controller 20 computes a mass equation for the combined machine and driver system, and solves the equation to minimize a predetermined cost function. The cost function determines what total force (such as a combined spring and damping force) should be applied between the seat 16 and vehicle 12 to achieve a desired result (such as minimal vibration of the driver's head). The controller 20 then provides a control signal, corresponding to the solution of the mass equation, to the actuator 22.

The controller 20 may take into account the head, neck, and lower torso accelerations, as well as the relative displacement between the seat 16 and the vehicle chassis floor. The cost function may also reflect forces applied to the lower back of the driver and between the head and neck. Consequently, the control signal, sent by the controller 20 to the actuator 22, may be said to represent a characteristic force. Upon receiving the control signal, the actuator affects the force applied by the vehicle 12 to the seat 16, substantially reducing the forces applied to the driver 16 and the resultant vibration of the driver's body. This may help substantially to control fatigue and stress conditions resulting from the dynamic activity of the upper body.

The actuator 22 may be either active (such that it may add energy to the system) or semi-active (such that it adds no energy to the system). In both cases, the stiffness and damping are evaluated by the controller 20 so that they will best represent the minimum response imposed by cost function. In determining the optimum solution of the cost function, the control may be said to be determining the characteristic force by determining what force would enable the driver's body to meet predetermined vibration criteria.

An actuator 22 that is active applies a force between the seat 16 and the rest of the vehicle 12 in response to the control signal. Such an actuator 22 may comprise, for example, a slider mechanism to adjust the magnitude of the force applied between the seat 16 and vehicle 12. Such mechanisms, which include electrical servomotors, are well known to those of ordinary skill in the art.

The actuator 22 may also be semi-active, depending on the parameters' characteristics of the threshold limits used for the variation of the stiffness and damping. A semi-active actuator 22 controls the force applied to the seat 16 by controlling the damping coefficient of a spring and damper assembly between the seat 16 and truck 12. The semi-active actuator may be used where the stiffness is kept constant and the damping fluctuates between an upper bound and lower a bound.

Regardless of whether an active or semi-active actuator 22 is used, the seat suspension system 10 is dependent on the human body response to the excitation, coming from an outside source, such as road irregularities, water waves, changes in acceleration, impacts, and irregularities induced from sound and vibration. A servomotor 23, which, together with associated linkages, may serve as either an active or semi-active actuator, is shown in FIG. 5.

A model of the human body such as that shown in FIG. 2 may be conceptualized. In such a model, the human body includes a plurality of sections, which include the head 34, upper, middle, and lower torso sections 36, 38, 40, and upper and lower leg sections 42, 44. The body sections 34, 36, 38, 40, 42, 44 are interconnected with assemblies 46, 48, 50, 52, and 54 that functionally resemble springs and dampers. The cushion and springs of the seat 16 may also be modeled as a spring and damper assembly 47, just as the actuator 22 can be modeled as a spring and damper assembly 49.

The extent that the human model interconnection assemblies 46, 48, 50, 52, 54 move, a human operator's interconnections (made up of muscles and ligaments) would be subjected to force. The more force applied to the interconnections 46, 48, 50, 52, 54, the more that the muscles and ligaments are flexed, and the more uncomfortable and tired a human driver 14 would become when undergoing similar vibrations.

In one embodiment, inputs from both the body and vehicle sensors 24, 32 are all dynamically used by the controller 20 to affect the operation of the actuator 22. In another embodiment, the controller 20 includes a memory that has within it a model representation of the human body, such as that represented by FIG. 2. In such a case, rather than using actual measurements of the response of the driver 14 to the sensed vibration of the truck 12, the controller 20 simply receives the vehicle sensor inputs regarding the vibration, estimates a human body's reaction, based on the model described in memory, and thereafter determines a solution of the mass equation for minimum cost. Different types of human body models may be adapted for, by way of example, size, weight, or gender.

The controller 20 may then send a control signal to the actuator 20, without actually receiving inputs from the body sensors 24. Of course, the controller 22 may have a variety of different body models in its memory and, in another embodiment, the driver may select a particular body profile to be used while she is driving the vehicle. The controller uses predetermined human body responses to vibration to decide what characteristic force best meets the predetermined objective of controlling the vibration of the driver's body.

$$M\ddot{z}+D\dot{z}+Fz+d_2u=b_1z_0, \quad (1)$$

The mass, damping, and stiffness matrices, M, D, F, are shown below:

$$M = \text{diag}(m_1\ m_2\ m_3\ m_4\ m_5\ m_6\ m_7\ m_8),$$

$$D = \begin{bmatrix} k_1 & -k_1 & 0 & 0 & 0 & 0 & 0 & 0 \\ -k_1 & k_1+k_2 & k_2 & 0 & 0 & 0 & 0 & 0 \\ 0 & -k_2 & k_2+k_3 & k_3 & 0 & 0 & 0 & 0 \\ 0 & 0 & -k_3 & k_3+k_4+k_5 & -k_4 & -k_5 & 0 & 0 \\ 0 & 0 & 0 & -k_4 & k_4 & 0 & 0 & 0 \\ 0 & 0 & 0 & -k_5 & 0 & k_5+k_6^* & -k_6^* & 0 \\ 0 & 0 & 0 & 0 & 0 & -k_6^* & k_7+k_6^* & -k_7 \\ 0 & 0 & 0 & 0 & 0 & 0 & -k_7 & k_7 \end{bmatrix}$$

$$F = \begin{bmatrix} s_1 & -s_1 & 0 & 0 & 0 & 0 & 0 & 0 \\ -s_1 & s_1+s_2 & s_2 & 0 & 0 & 0 & 0 & 0 \\ 0 & -s_2 & s_2+s_3 & s_3 & 0 & 0 & 0 & 0 \\ 0 & 0 & -s_3 & s_3+s_4+s_5 & -s_4 & -s_5 & 0 & 0 \\ 0 & 0 & 0 & -s_4 & s_4 & 0 & 0 & 0 \\ 0 & 0 & 0 & -s_5 & 0 & s_5+s_6^* & -s_6^* & 0 \\ 0 & 0 & 0 & 0 & 0 & -s_6^* & s_7+s_6^* & -s_7 \\ 0 & 0 & 0 & 0 & 0 & 0 & -s_7 & s_7+s_8 \end{bmatrix}$$

In one embodiment, the system 10 uses signal from the body and/or vehicle sensors 24, 32 to dynamically control the characteristic force necessary so that the actuator 22 may substantially minimize transmission of energy from the vehicle 12 to the driver 14. In another embodiment, however, the controller 20 includes a neuro-network that allows it to "remember" calculations. Consequently, once the controller 20 has responded to a particular type of vehicle movement, it will react much faster the next time the same road conditions occur.

A more detailed discussion of the modelling and optimization operations performed by the controller 20 follows in the following five subsections.

1) Human and Vehicle System Modelling

As shown in FIG. 2, the human body of the driver is modelled as a multisegment mass composed of six segments 34, 36, 38, 40, 42, 44. The vehicle, as shown in FIGS. 1 and 3, includes the tire 56, which defines a tire stiffness, suspension 58, and truck body mass, as well as the seat 16. The human body connecting forces are modelled as linear springs and dampers. Appropriate coefficients may be obtained from McLeod, R. W. and Griffin, M. J. (1989), "A Review of the Effects of Translation Whole Body Vibration on Continuous Manual Control," Journal of Sound and Vibration, Vol. 56, pp. 415–457, as well as Amirouche, F., and Ider, S. K. (1988) "Simulation and Analysis of a Biodynamic Human Model Subjected to Low Accelerations—A Correlation Study," Journal of Sound and Vibration, Vol. 123, No. 2, pp. 281–292. These parameters were adjusted so that the natural frequencies of the body are within acceptable ranges.

The general representation of the governing equations of the driver-vehicle system is given by the following mass equation:

where parameters denoted by an asterisk are those belonging to the driver seat suspension.

The disturbance and control inputs are defined by $b_2$ and $b_1$. The generalized coordinate vector of the system is given as:

$$z^T = [z_1 z_2 z_3\ z_4 z_5 z_6 z_7 z_8].$$

The mass equation above can be rewritten in a usual state-space form as follows:

$$\dot{x} = Ax + B_1 z_0 + B_2 u,$$

where the above matrices are given by:

$$A = \begin{bmatrix} 0_{8\times 8} & I_8 \\ -M^{-1}F & -M^{-1}D \end{bmatrix}, B_1 = \begin{bmatrix} 0_{8\times 1} \\ -M^{-1}b_2 \end{bmatrix}, B_2 = \begin{bmatrix} 0_{8\times 1} \\ -M^{-1}b_2 \end{bmatrix}$$

and the state vector (x) of the system can be partitioned as:

$$x^T[z^T \dot{z}^T].$$

The performance output of the system is expressed in the following form:

$$y_1 = C_1 x + D_{11} z_0 + D_{12},$$

where vector $y_1$ contains all the system outputs to be controlled.

2) Controller Operation

The procedure utilized by the controller 20 during the operation of the system 10 is described below:

Step I: Start

Initialize the data

1) Tire masses, vehicle masses, inertia properties, and human body model, such as $m_1$=tire
$m_2$=vehicle chassis (cabin)
$m_3$=seat
.
.
.
(human body mass segments)
$m_{B1}$=head mass
$m_{B2}$=upper torso
.
.
.
$m_{BN}$=lower extremities 2) Supply stiffness and damping coefficients for the vehicle/human body system 3) Formulate the state-space equations of motion $$x = Ax + B_1 z_u + B_{2u}$$

where $$A = \begin{vmatrix} 0 & I \\ -M^1 F & -M^1 D \end{vmatrix}, B_1 = \begin{vmatrix} 0 \\ -M^1 b_2 \end{vmatrix}, B_2 = \begin{vmatrix} 0 \\ -M^1 b_2 \end{vmatrix}$$

and $$x = [\dot{z}]$$

where z: displacement vector
$\dot{z}$: velocity vector
M: mass matrix
F: stiffness matrix
D: damping matrix
$Z_0$: excitation from the road
U: disturbance

Step II: Optimization

The procedure of Step I above is repeated until the optimum values of the seat suspension to satisfy the cost function are found.

Cost function=Minimize the acceleration of certain parts of the body and the work performed by the body forces (muscles).

Step III: Adjustment

The optimum stiffness and damping coefficients found in Step II above are fed to the controller 20 to adjust the seat force suspension.

Additional Features a) Real time evaluation of suspension model using neural network.
b) Real time evaluation of tire characteristics using neural network.
c) Real time evaluation of human model using neural network (optional).

3) System Frequency Characteristics

The transfer function between the accelerations of driver body segments 34, 36, 38, 40, 42, 44, body internal forces, and the road input are defined by the controller 20. The Bode graph in FIG. 6 represent experimentally derived stress curves in the frequency domain. The stress and fatigue factors are studied by examining the connectives body forces work performed under the road excitations.

The weakening of the muscles and ligaments has a tendency to alter the body performance during the course of a long ride. Comfort, on the other hand, may be perceived as a sensation measured in terms of displacement and accelerations the driver actually feels which is directly related to the seat acceleration and the body segments accelerations.

FIG. 6 shows peaks of resonance of the vehicle-human model. There are distinctive peaks at 0.5 Hz and 1.4 Hz, corresponding to the driver seat 16 and vehicle body mass, respectively. The driver natural frequencies are in the range 1 Hz–10 Hz, with the head being at 40 Hz. The controller 20 allows one to adjust the stiffness parameters to yield particular peaks at given frequency ranges. The representation of the transfer function in relation to the internal forces and road excitations reveals similar results as anticipated with slight differences in magnitudes.

The vehicle-driver model uses unknown damping and stiffness forces at the seat level. Given certain cost functions, the stiffness and damping forces at the seat may be identified, after a history of measurements is developed, as a function of the input excitation profile depicting the road.

Figure 4:
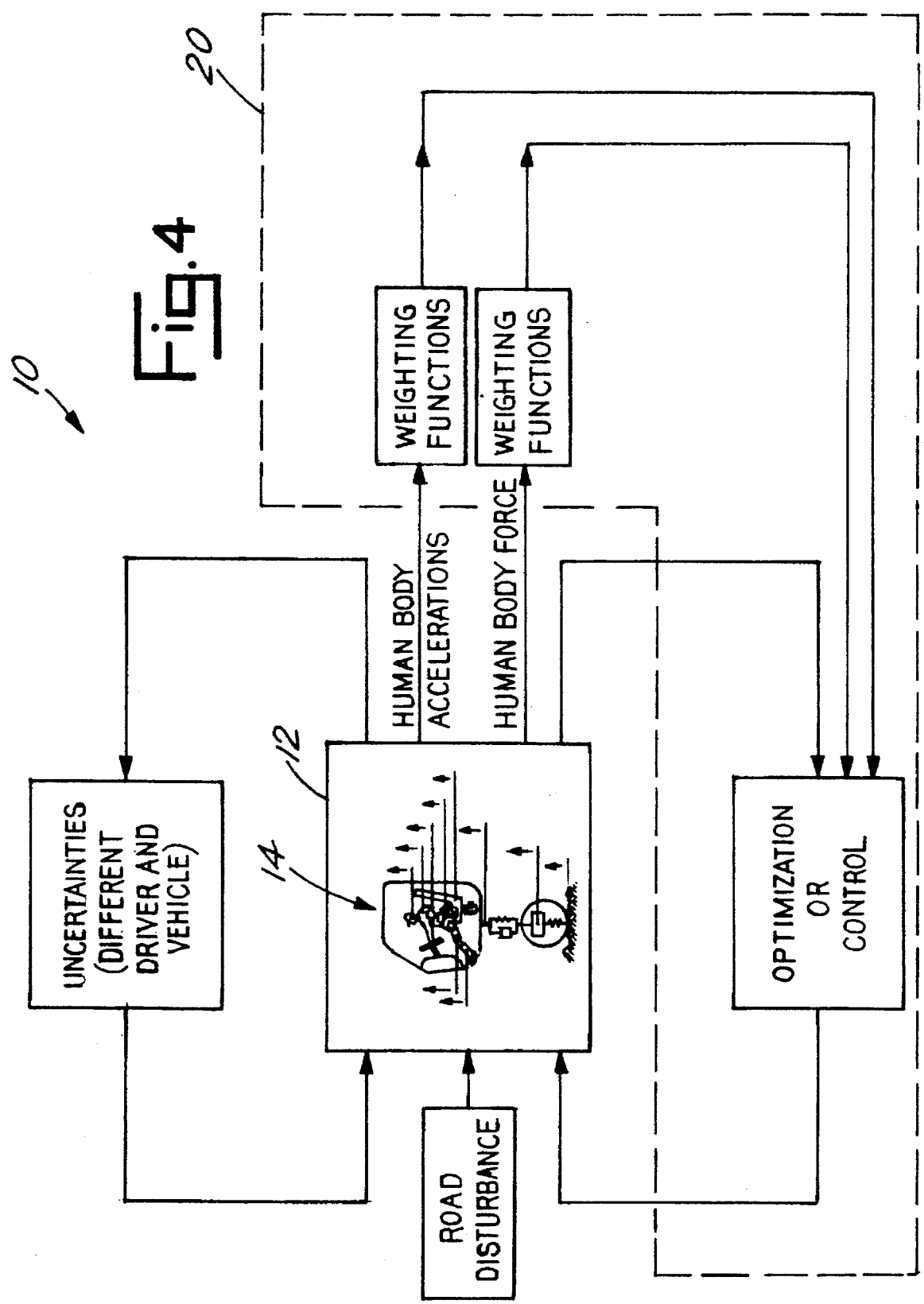
FIG. 4 a block diagram of the present invention, as utilized by the truck shown in FIG. 1.

The present system 10, as in FIG. 4, shows the standard M-Δ structure of the uncertain dynamic system. Road disturbances and uncertainty dynamically affect the truck 12 and driver 14. Sensor outputs regarding the accelerations and forces on the driver's body segments are provided to the controller 20. The controller uses appropriate weighting functions and optimization to determine the characteristic force that the actuator 22 should apply between the seat 16 and truck 12 for the best solution of the cost function. A computer simulation of the vehicle/human body system can be performed to identify the initial values of the stiffness and damping coefficients ("initial estimation values"). The evaluation of the characteristic force will then be computed more rapidly.

The state-equation of the uncertain driver/vehicle system can be written as follows:

$$\dot{x} = (A_0 + L\Delta N^T) x + B_1 z_0 B_2 u.$$

4) Solution to the Optimization Problem Employed by the Controller 20

The dynamic equations are solved by the controller 20 at each step by seeking, through the cost function, the optimum values for the stiffness and damping applying stochastic road excitation. The road input may be modelled as a colored, zero-mean, Gaussian-distributed white noise process with the following shape-filter:

$$\dot{z}_0(t) + w(t)$$

The parameters of the vehicle and the human model are shown below:

| Parameter | Symbol | Unit | Value |
|---|---|---|---|
| Mass of the head | $m_1$ | kg | 5.7 |
| Mass of the shoulder | $m_2$ | kg | 17.6 |
| Mass of the chest | $m_3$ | kg | 2.69 |
| Mass of the lower hip | $m_4$ | kg | 11.76 |
| Mass of the legs | $m_5$ | kg | 14 |

-continued

| Parameter | Symbol | Unit | Value |
|---|---|---|---|
| Mass of the driver seat | $m_6$ | kg | 30 |
| Mass of the vehicle body | $m_7$ | kg | 4000 |
| Mass of the wheel | $m_8$ | kg | 50 |
| Spring stiffness in the neck | $s_1$ | N/m | 120,000 |
| Spring stiffness in the chest | $s_2$ | N/m | 105,000 |
| Spring stiffness in the hip | $s_3$ | N/m | 105,000 |
| Spring stiffness between the leg and torso | $s_4$ | N/m | 50,000 |
| Spring stiffness of the seat cushion | $s_5$ | N/m | 10,000 |
| Primary suspension stiffness | $s_7$ | N/m | $5 \times 10^5$ |
| Tire stiffness | $s_8$ | N/m | $3.5 \times 10^6$ |
| Damping coefficient in the neck | $k_1$ | Ns/m | 1,500 |
| Damping coefficient in the chest | $k_2$ | Ns/m | 1,600 |
| Damping coefficient in the hip | $k_3$ | Ns/m | 1,800 |
| Damping between the leg and torso | $k_4$ | Ns/m | 1,100 |
| Damping coefficient of the seat cushion | $k_5$ | Ns/m | 100 |
| Primary suspension damping ratio | $k_7$ | Ns/m | 15,000 |

For the cost function indicated below, the constrained and unconstrained cases discussed above were solved. This represents the case when upper and lower limits are imposed on the coefficients of the stiffness and damping versus the case when they are treated as free variables.

Defining the following performance output vector and weighing matrix, $$y_1 = \begin{vmatrix} z_7 - z_6 \\ z_4 \\ z_1 \end{vmatrix}, Q_0 = \begin{vmatrix} q_1 & 0 & 0 \\ 0 & q_2 & 0 \\ 0 & 0 & q_3 \end{vmatrix}$$

the performance index to be minimized can be written as:

$$J_{option} = \lim_{T \to \infty} \frac{1}{T} \int_0^T (y_1^T Q_0 y_1) dt.$$

The weighing factors $q_1$ have two distinctive roles: making the expression dimensionless and allowing for different factors. The values selected for this simulation were as follows: $q_1 = 9_1$, $q_2 = 1$, $q_3 = 8$.

Figure 7A:
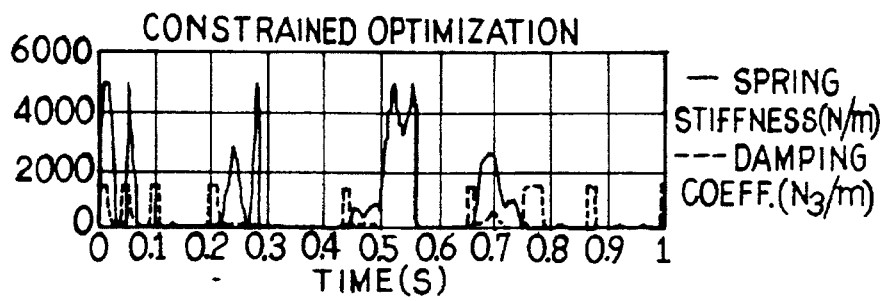
FIG. 7a is a graph showing the stiffness coefficients and the damping coefficients for the constrained case for the semi-active actuator which may be used with the invention shown in FIG. 4.

FIG. 7a depicts the values of the stiffness coefficients (solid line) and damping coefficients (dashed line) for the constrained case. A lower bound and an upper bound of the stiffness value between 100 N/m and 5000 N/m were used. As can be seen, the activation of the seat interface stiffness varies with time in a linear fashion as an impulse and then retracts. These results are obtained for the road excitation given by FIG. 7f.

Figure 7B:
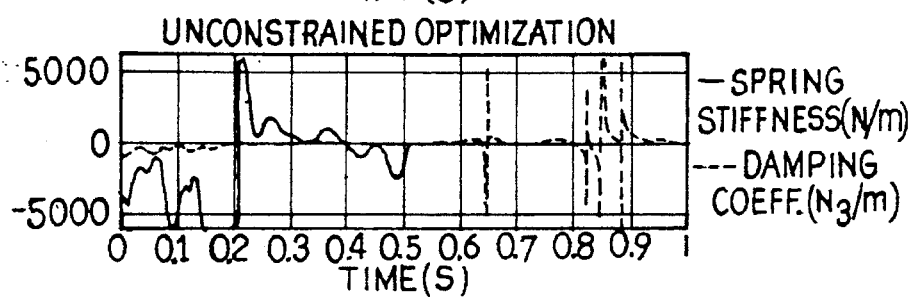
FIG. 7b is a graph showing the stiffness coefficients and the damping coefficients for the unconstrained case for the semi-active actuator which may be used with the invention shown in FIG. 4.

The changes in stiffness value occur in successive peaks in a span of time less than or equal to 0.1 seconds. For the unconstrained case, when the spring and damper are not bounded, FIG. 7b shows that the stiffness and damping fluctuate between negative and positive values describing the exchange of energy in the system. Negative stiffness indicates that external energy must be introduced to the system (through an active actuator), whereas positive values shows that system needs to dissipate energy. From FIG. 7a and 7b, one may observe that the bounded algorithm provides only positive values and, therefore, does not require any external input: only the storage and the dissipation of the energy is controlled.

Figure 7C:
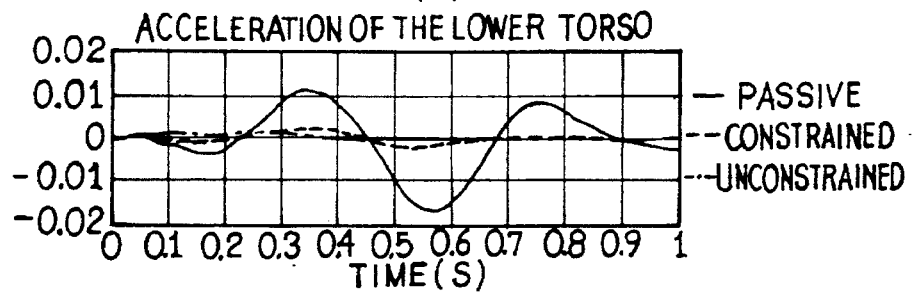
FIG. 7c is a graph showing the acceleration of the lower torso for the semi-active actuator which may be used with the invention shown in FIG. 4.
Figure 7D:
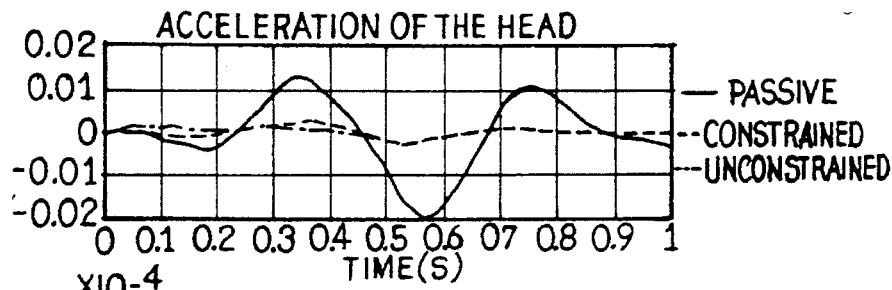
FIG. 7d is a graph showing the acceleration of the head for the semi-active actuator which may be used with the invention shown in FIG. 4.
Figure 7E:
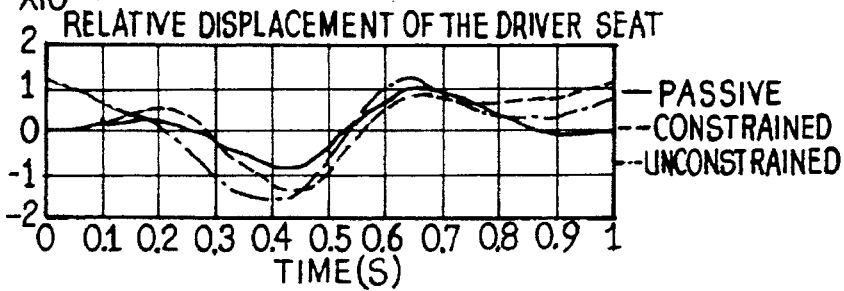
FIG. 7e is a graph showing the relative displacement of the seat for the semi-active actuator which may be used with the invention shown in FIG. 4.
Figure 7F:
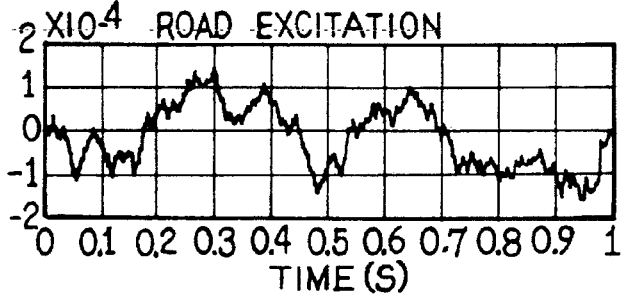
FIG. 7f is a graph showing the road excitation used for the semi-active actuator which may be used with the invention shown in FIG. 4.

FIGS. 7c and 7d show that the acceleration of the lower torso and head response for both cases of the optimization are found to be substantially similar. Therefore, for an objective of providing stability and minimum transmission of vibration to the body, then the constrained case may well be adequate in many cases. The dynamics of the seat 16 are shown in FIG. 7e, where the amplitude of the constrained case is slightly higher, as it requires the system to produce more energy. It is often important that the neck forces be reduced, since that condition could fatigue the neck muscles and possibly cause the driver's vision performance to decrease in time.

Thus, human comfort and performance may be enhanced by implementing the bounded, constrained, optimization results. This means that with only the active variation of the passive, two-state parameters, the system's performance can be improved without additional energy. Therefore, there are two alternative embodiments of the present invention: a semi-active approximation of the optimization, when only the damping coefficient is varying between two limits; and a variable structure controller, making use of sliding mode control, when both values are varied between the lower and higher limits.

5) Derivation of the Semi-Active Control Strategy

The semi-active damping concept is based on using a variable coefficient damper, whose actual coefficient is set according to some predetermined control law. On the basis of the active optimal force ($u_{active}$) acting on the driver seat, the optimal "damping coefficient" can be defined as follows:

$$k_{opt} = \frac{u_{active}}{z_6 - z_7},$$

where $k_{opt}$ can be either positive or negative. If an active actuator is set between the seat and the vehicle floor, then the actuator is required to produce energy when $k_{opt}$ is negative and dissipate energy otherwise. In a semi-active case, the damping coefficient may vary between positive lower and upper bounds. When its value is positive, three different control strategies may be used:

1. Discrete semi-active damping (DSAD), in which case the switching pattern between the minimum and the maximum damper states can be written as follows:

$$k_{opt} < 0, k_{DEAD} = k_{min}.$$

$$k_{opt} > 0, k_{DEAD} = k_{max}$$

2. Discrete semi-active damping with extended control (DESAD), which takes into consideration not only the sign of the optimal damping, but also its magnitude:

$$k_{opt} < \frac{k_{min} + k_{max}}{2}, k_{DESAD} = k_{min}$$

$$k_{opt} > \frac{k_{min} + k_{max}}{2}, k_{DESAD} = k_{max}.$$

3. Continuous semi-active damping (CSAD), which adjusts the actual value of the optimal damping between the prescribed limits, and also adjusts maximum or minimum values that occur outside the bounded region:

$$k_{opt} < k_{min}, k_{CSAD} = k_{min}.$$

$$k_{min} \leq k_{opt} \leq k_{max}, k_{CSAD} = k_{opt}.$$

$$k_{opt} > k_{max}, k_{CSAD} = k_{max}.$$

All of the control strategies seem to improve on the acceleration of the lower torso to some extent. However, there is a slight difference in the switching pattern. The application of the DESAD control results in a slightly less frequent switching than the DSAD. The CSAD control results in a fairly smooth damping function, and it follows the pattern of the discrete dampers, except that it does not switch when the required damping coefficient is between the limits.

Thus, an advantage of the present invention is the use of the "man-in-a-loop," where both the vehicle and the body are integrated together to form the general system for which the control is designed. The system may employ an active or semi-active actuator. Also, the control may use actual, dynamic signals from sensors worn by the driver, or the controller may use a model of the human body to estimate the effect of a particular vibration on the body.

If a model is to be used with the present invention, a human body model, with its corresponding connective forces, may be provided to the controller's memory. Alternatively, the controller 20 may estimate the body connective forces through the transfer functions, resulting from the body response to external stimulus. The invention may be applied to a wide range of vehicles, provided that the vehicle model is first developed.

Preferred embodiments of the present invention have been described herein. It is to be understood, however, that changes and modifications can be made without departing from the true scope and spirit of the present invention. This true scope and spirit are defined by the following claims, to be interpreted in light of the foregoing specification.

I claim:

1. A seat suspension system for controlling force between a vehicle and a seat for holding a human body comprising, in combination:

a movement sensor for sensing movement of said vehicle and providing a vehicle movement signal;

a controller for receiving said vehicle movement signal, said controller using a predetermined human body vibration response corresponding to said vehicle movement signal to responsively provide a control signal; and an actuator, interconnected between said seat and said vehicle, for receiving said control signal and responsively controlling the force between said seat and said vehicle.

2. A seat suspension system as claimed in claim 1 wherein said controller uses predetermined vibration criteria to determine a characteristic force for said actuator and said control signal corresponds to said characteristic force.

3. A seat suspension system as in claim 2 wherein said actuator is active and, in response to said control signal, said actuator expends energy to move said seat with respect to said vehicle and reduce vibratory force from said vehicle to said human body.

4. A seat suspension system as in claim 2 wherein said actuator is semi-active and, in response to said control signal, said actuator changes damping characteristics of said actuator and reduces vibratory force from said vehicle to said human body.

5. A seat suspension system for controlling force between a vehicle and a seat for holding a human body comprising, in combination:

a movement sensor for sensing movement of said human body in said seat and responsively providing a body movement signal;

a movement sensor for sensing movement of said vehicle and providing a vehicle movement signal;

a controller for receiving said human and vehicle movement signals and responsively providing a control signal; and an actuator, interconnected between said seat and said vehicle, for receiving said control signal and responsively controlling the force between said seat and said vehicle.

6. A seat suspension system as claimed in claim 5 wherein said controller uses predetermined vibration criteria to determine a characteristic force for said actuator and said control signal corresponds to said characteristic force.

7. A seat suspension system as in claim 6 wherein said actuator is active and, in response to said control signal, said actuator expends energy to move said seat with respect to said vehicle and reduce vibratory force from said vehicle to said human body.

8. A seat suspension system as in claim 6 wherein said actuator is semi-active and, in response to said control signal, said actuator changes damping characteristics of said actuator and reduces vibratory force from said vehicle to said human body.

* * * * *